(12) United States Patent
Junuzovic et al.

(10) Patent No.: US 7,774,703 B2
(45) Date of Patent: Aug. 10, 2010

(54) VIRTUAL SHADOW AWARENESS FOR MULTI-USER EDITORS

(75) Inventors: Sasa Junuzovic, Collingwood (CA); Prasun Dewan, Chapel Hill, NC (US); Yong Rui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1049 days.

(21) Appl. No.: 11/351,049

(22) Filed: Feb. 9, 2006

(65) Prior Publication Data
US 2007/0186171 A1    Aug. 9, 2007

(51) Int. Cl.
*G06F 17/21* (2006.01)
(52) U.S. Cl. .................. 715/246; 715/229; 715/230; 715/231; 715/232; 715/233; 715/273; 715/275; 715/751; 715/754
(58) Field of Classification Search ......... 715/229–233, 715/246, 273, 275, 751, 754
See application file for complete search history.

(56) References Cited

U.S. PATENT DOCUMENTS

| | | | | |
|---|---|---|---|---|
| 6,049,334 | A * | 4/2000 | Bates et al. | 715/755 |
| 7,353,252 | B1 * | 4/2008 | Yang et al. | 709/204 |
| 2003/0058281 | A1 * | 3/2003 | Kepros et al. | 345/786 |
| 2003/0179230 | A1 * | 9/2003 | Seidman | 345/750 |

OTHER PUBLICATIONS

Microsoft Word 2003 screenshots, 2003, Microsoft Corporation.*

Gutwin, C., Roseman, M., and Greenberg, S. A Usability study of awareness widgets in a shared workspace groupware system. Proc. CSCW 1996.
Greenberg, S., Gutwin, C., and Cockburn, A. Awareness through fisheye views in relaxed-WYSIWIS groupware. Graphics Interface 1996.
Xia, S., Sun, D., Sun, C., Chen, D., and Shen, H. Leveraging single-user applications for multi-user collaboration: the Coword approach. Proc. CSCW 2004.
Microsoft Office OneNote 2003. www.microsoft.com/office/onenote/.
Ellis, C.A., Gibbs, S.J., and Rein, G. Groupware: some issues and experiences. CACM. Jan. 1991. vol. 34. Issue 1.
Bier, E.A., Freeman, S., and Pier, K. MMM: the multi-device multi-user multi-editor. Proc. CHI 1992.
Baecker, R.M., Nastos, D., Posner, I.R., and Mawby, K.L. The user-centred iterative design of collaborative writing software. Proc. INTERCHI 1993.
Schafer, W.A. And Bowman, D.A. A comparison of traditional and fish-eye radar view techniques for spatial collaboration. Graphics Interface 2003.
Lu, J. Sharing semi-heterogeneous single-user editors for real-time group editing. Master's Thesis. Department of Computer Science. Texas A&M University. May 2005.

(Continued)

*Primary Examiner*—Joshua D Campbell

(57) ABSTRACT

Techniques are provided for indicating workspace awareness using one or more of a write shadow, a read shadow, and/or a shadowbar providing an indication of operations performed at associated locations by various users accessing a same document. A write shadow may be used to indicate a position in a document being modified by a user. A read shadow may be used to indicate a position being viewed by a user. A shadowbar may be used to indicate areas of overlap among users with a shading and coloring indicative of a degree of overlap.

15 Claims, 7 Drawing Sheets

OTHER PUBLICATIONS

Sellen, A., Buxton, B., and Arnott, J. Using spatial cues to improve videoconferencing. Proc. CHI 1992.

Okada, K., Maeda, F., Ichikawaa, Y., and Maatsushita, Y. Multiparty videoconferencing at virtual social distance: MAJIC design. Proc. CSCW 1994. p. 385-393.

Hill, W.C. and Hollan, J.D. Edit wear and read wear. Proc. CHI 92.

Foster, G. and Stefik, M. Cognoter: theory and practice of a collaborative tool. Proc. CSCW 86.

Fish, R.S., Kraut, R.E., Leland, M.D.P., and Cohen, M. Quilt—a collaborative tool for cooperative writing. Proc. COIS 1988.

Selinger, R. A distributed program for collaborative editing. Master's Thesis. MIT 1985.—Abstract Only.

Lewis, B.T. and Hodges, J.D. Shared Books: collaborative publication management for an office information system. ACM SIGOIS. 1988.

Smith, R.B., O'Shea, T., O'Malley, C., Scanlon, E., and Taylor, J. Preliminary experiments with a distributed, multi-media, problem solving experiment. Proc. ECSCW 1989.

Sarkar, M. and Brown, M.H. Graphical fisheye views of graphs. Proc. CHI 92.

Carl Gutwin and Saul Greenberg. "The effects of workspace awareness support on the usability of real-time distributed groupware." ACM Transactions on Computer-human interaction (TOCHI). 1999.

Gutwin, C., Greenberg, S., and Roseman, M. Workspace awareness in real-time distributed groupware: framework, widgets, and evaluation. Proc. British Computer Society Human Computer Interaction Specialist Group—People and Computers XI. 1996. p. 281-298.

Ellis, C.A. and Gibbs, S.J. Concurrency control in groupware systems. ACM SIGMOD Record. 1989.

Sun, C. and Ellis, C. Operational transformation in real-time group editors: issues, algorithms, and achievements. Proc. CSCW 1998.

Li, D. and Li, R. Preserving operation effects relation in group editors. Proc. CSCW 2004.

Ellis, C. A., Gibbs, S. J., and Rein G. L. "Design and use of a group editor." in engineering from human computer interaction. 1990—Powerpoint Slides Only—Paper Unobtainable.

Knister, M.J. and Prakash, A. DistEdit: a distributed toolkit for supporting multiple group editors. Proc. CSCW 1990.

Stefik, M., Foster, G., Bobrow, D.G., Kahn, K., Lanning, S., and Suchman, L. Beyond the chalkboard: computer support for collaboration and problem solving in meetings. CACM. Jan. 1987.

Stefik, M., Bobrow, D.G., Foster, G., Lanning, S., and Tatar, D. Wysiwis revised: early experiences with multi-user interfaces. ACM Transactions on Office Information Systems, 5:2, pp. 147-167, Apr. 1987.

Miwa, Y. and Ishibiki, C. Shadow communication: system for embodied interaction with remote users. Proc. CSCW 2004.

Dewan, P. and Choudhary, R. Flexible user interface coupling in collaborative systems. Proc. CHI 1991.

Begole, J. Rosson, M.B., and Shaffer, C.A. Flexible collaboration transparency: supporting worker independence in replicated application-sharing systems. ACM TOCHI 6(2): 95-132.

Marsic, I. and Dorohonceanu, B. Flexible user interfaces for group collaboration. International Journal of Human-Computer Interaction. 2003. 15(3). 337-360.

Olson, J.S., Olson, G.M, Storrøsten, M., and Carter, M. GroupWork close up: a comparison of the group design process with and without a simple group editor. ACM transactions on information systems. Oct. 1993. vol. 11. Issue 4.

Roseman, M. and Greenberg, S. Building real-time groupware with groupkit, a groupware toolkit. ACM transactions on computer-human interaction. Mar. 1996. vol. 3, Issue 1.

Hudson, S.E. and Smith, I. Techniques for addressing fundamental privacy and disruption tradeoffs in awareness support systems. CSCW 1996.

Neuwirth, M., Kaufer, D.S., Chandhok, R., and Morris, J.H. Issues in the design of computer support for co-authoring and commenting. Proc. CSCW 1990.

SubEthaEdit. http://www.codingmonkeys.de/subethaedit/.

Tsandilas, T. and Balakrishnan, R. An evaluation of techniques for reducing spatial interference in single display groupware. Proc. ECSCW 2005.

* cited by examiner

VIRTUAL SHADOW AWARENESS FOR MULTI-USER EDITORS

BACKGROUND

As workplace tasks increase in complexity, teams of two or more persons rather than individuals may be needed to accomplish the tasks. Traditional single-user editors may be of limited use for such collaborative tasks. In connection with such collaborative tasks, multi-user editors may be used. Multi-user editors may allow multiple users to work on different areas of a same document. One problem with such multi-user editors relates to multiple users attempting to modify a same portion of a document. As a solution, existing multi-user editors may lock a portion of a document when accessed by one user. However, use of locking introduces several difficulties including selecting a level of locking granularity and deciding when to release locks. Use of locking can also incur additional runtime overhead adversely impacting performance. As an alternative to locking, existing systems may use a technique to process the multiple modifications which may not produce semantically meaningful results.

Some multi-user editors may provide a user accessing a document with a mini-view of where other users are currently in the document. The mini-view may be, for example, a separate window containing a minimized view of the entire document with a relative location of where each user is viewing in the document. However, the foregoing requires additional devoted screen space.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Techniques are provided for indicating workspace awareness using one or more of a write shadow, a read shadow, and/or a shadowbar providing an indication of operations performed at associated locations by various users accessing a same document. A write shadow may be used to indicate a position in a document being modified by a user. A read shadow may be used to indicate a position being viewed by a user. A shadowbar may be used to indicate areas of overlap of the scrollbars of users, the shadowbar having a shading and coloring indicative of a degree of overlap.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
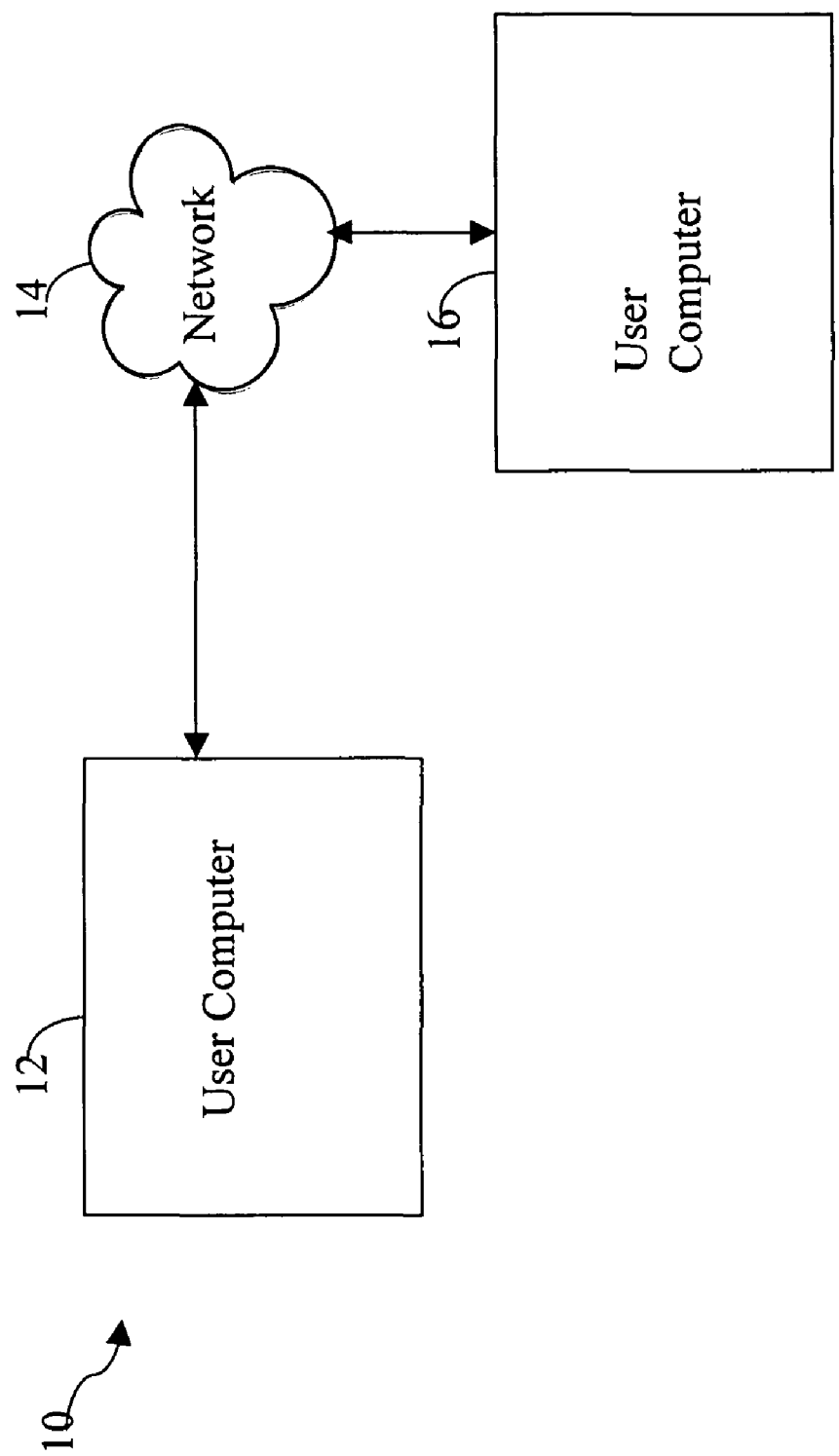
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are user computers 12 and 16, and a network 14. The user computers 12 and 16 may include a standard, commercially-available computer or a special-purpose computer that may be used to execute one or more program modules. Described in more detail elsewhere herein are program modules that may be executed by the user computers 12 and 16 in connection with the techniques described herein. The user computer 12 may operate in a networked environment and communicate with the user computer 16 and other computers not shown in FIG. 1.

It will be appreciated by those skilled in the art that although the user computers are shown in the example as communicating in a networked environment, the user computers 12 and 16 may communicate with other components utilizing different communication mediums. For example, the user computer 12 may communicate with one or more components utilizing a network connection, and/or other type of link known in the art including, but not limited to, the Internet, an intranet, or other wireless and/or hardwired connection(s).

Figure 2:
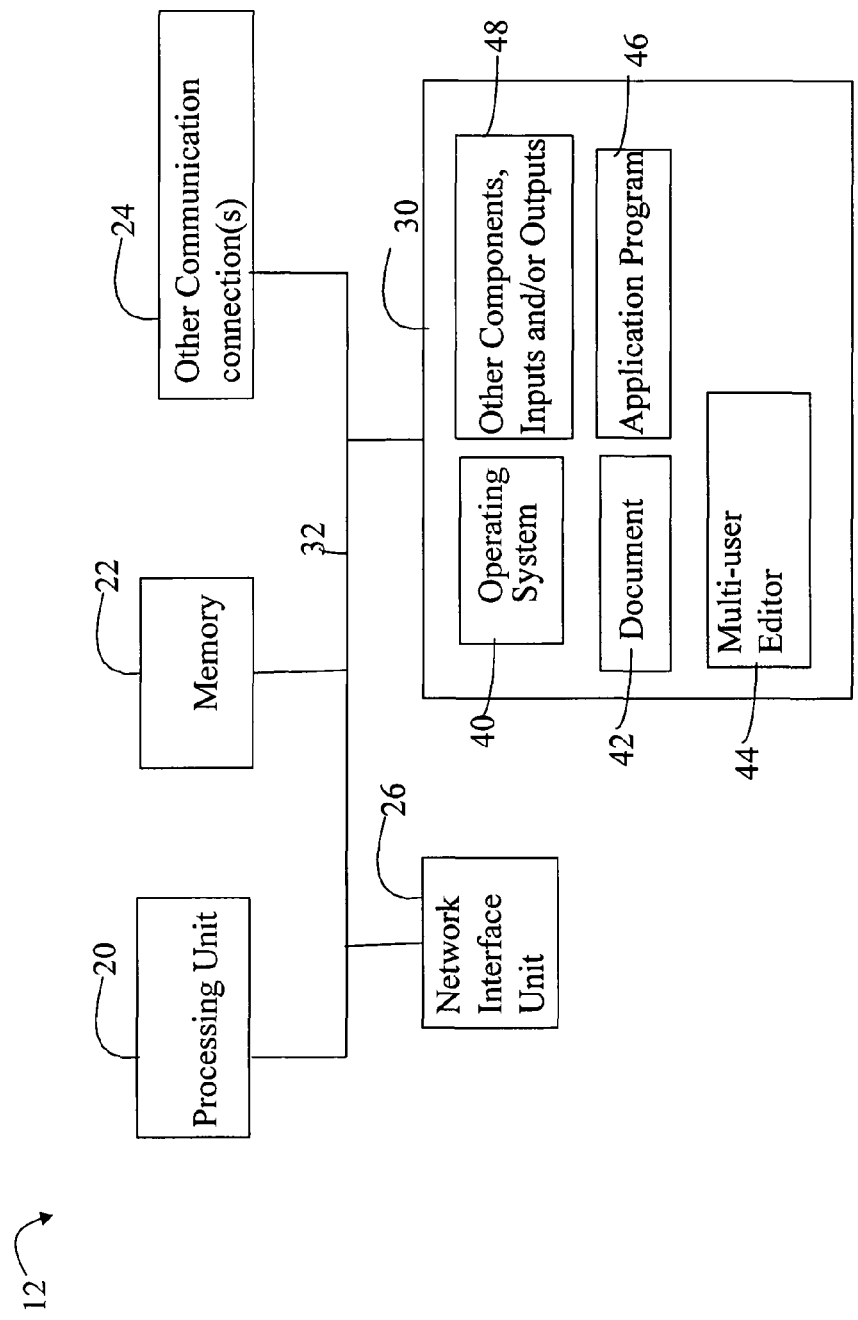
FIG. 2 is an example of components that may be included in an embodiment of a user computer for use in connection with performing the techniques described herein.

Referring now to FIG. 2, shown is an example of components that may be included in a user computer 12 as may be used in connection with performing the various embodiments of the techniques described herein. It should be noted that although FIG. 2 illustrates additional detail with respect to only the user computer 12, the components of FIG. 2 may be included in user computer 16. The user computer 12 may include one or more processing units 20, memory 22, a network interface unit 26, storage 30, one or more other communication connections 24, and a system bus 32 used to facilitate communications between the components of the computer 12.

Depending on the configuration and type of user computer 12, memory 22 may be volatile (such as RAM), non-volatile (such as ROM, flash memory, etc.) or some combination of the two. Additionally, the user computer 12 may also have additional features/functionality. For example, the user computer 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the user computer 12. The storage 30 in one embodiment may be a mass-storage device with associated computer-readable media providing non-volatile storage for the user computer 12. Although the description of computer-readable media as illustrated in this example may refer to a mass storage device, such as a hard disk or CD-ROM drive, it will be appreciated by those skilled in the art that the computer-readable media can be any available media that can be accessed by the user computer 12.

By way of example, and not limitation, computer readable media may comprise computer storage media and communication media. Memory 22 and storage 30 are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by user computer 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The user computer 12 may also contain communications connections, 24 that allow the user computer to communicate with other devices and components such as, by way of example, input devices and output devices. Input devices may include, for example, a keyboard, mouse, pen, voice input device, touch input device, etc. Output devices, may include, for example, a display, speakers, printer, and the like. These and other devices are well known in the art and need not be discussed at length here. The one or more communications connections, 24 are an example of communication media.

In one embodiment, the user computer 12 may operate in a networked environment as illustrated in FIG. 1 using logical connections to remote computers through a network. The user computer 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the user computer 12, one or more of these elements included in the storage 30 may also reside in a portion of memory 22, such as, for example, RAM for controlling the operation of the user computer 12. The example of FIG. 2 illustrates various components including an operating system 40, one or more documents 42, a multi-user editor 44, an application program 46, and other components, inputs, and/or outputs 48. The operating system 40 may be any one of a variety of commercially available or proprietary operating system. The operating system 40, for example, may be loaded into memory in connection with controlling operation of the user computer. One or more application programs 46 may execute in the user computer 12 in connection with performing user tasks and operations.

In connection with editing a document 42, a multi-user editor 44 may be used. In connection with the techniques described herein, a multi-user editor may provide for synchronous editing of the document 42 by multiple users. Multiple users, such as using user computers 12 and 16 and possibly others not illustrated but having connectivity to 12 and 16, may edit a same document 42 as part of a collaborative editing session. One embodiment of the multi-user editor 44 utilizing the techniques described herein may provide for synchronous multi-user editing in which the editing being performed on the document as viewed on each user computer is synchronized to reflect the collective editing of all co-editors or users. Additionally, the multi-user editor may support view divergence in which each user can work on different portions of the same document. Using the workspace techniques described herein, a flexible and efficient approach may be used to enable one user to determine the location in the document and task being performed by other co-editors. Workspace awareness may be characterized as current knowledge about co-editor interaction with respect to the shared workspace which, in this example, is the document. In connection with workspace awareness, information may be, provided that compensates for loss of co-editors awareness in systems supporting view divergence.

The techniques described herein have been designed to facilitate and promote four awareness criteria—write awareness, read awareness, navigation awareness, and in-place. Each of the different techniques described herein may meet one or more of these. Write awareness may be characterized as awareness of the location of other co-editors making text modifications or additions. Write awareness may be used in coordinating text changes by co-editors to prevent conflicting edits to a common portion of the document. Using the techniques described herein for promoting write awareness, users may be aware of write operations being performed by others and may accordingly avoid simultaneously modifying a same portion of a document. Read awareness may be characterized as awareness of a co-editors viewing text that is being modified locally by a user. Providing awareness of where co-editors are looking in a document may provide an indication to a user as to the focus of other co-editors. Navigation awareness may be characterized as expediting view synchronization with others providing an awareness of where others are navigating or scrolling with respect to the entire document. In-place criteria may be characterized as using techniques which minimize or reduce the amount of dedicated screen real-estate used.

The techniques described herein may also utilize the concept of a shadow to represent a user's location in the document in connection with performing various editing tasks. In particular, the techniques described herein utilize a write shadow for promoting write awareness, a read shadow for promoting read awareness, and a shadowbar for promoting navigation awareness. The techniques described herein provide for awareness in-place by minimizing the amount of dedicated screen real-estate or screen portions used in providing the awareness. As will be described in following paragraphs, the read and write shadows and the shadowbar in one embodiment utilize no additional screen portions beyond what is needed to display a document's content which may include, for example, text, images and figures. The tools described herein are superimposed on the text editing area and rendered transparently to hide no content. The tools may utilize different colors, shades of grey and the like, in distinguishing and representing the various users or co-editors. For illustration purposes, various shades of grey are used in representing the different shadows. The different shadows (e.g., write shadow, read shadow, and shadowbar) have a level of transparency or opaqueness so that any underlying content is not obscured by the shadow. The content is overlayed by the shadow with the underlying text showing through. In other embodiments, read shadows, write shadows and the shadowbar may be transparent and of varying colors. The techniques described herein may be characterized as "in-place" in that the read and write shadows, and the shadowbar are transparently superimposed on text-editing areas already used in connection with displaying text.

What will be described in following paragraphs are the workspace awareness techniques. It should be noted that although the techniques described herein are illustrated in connection with multi-user editing, it will be appreciated by those skilled in the art the techniques described herein have much broader applicability and use than just editing. Some other examples are also described in following paragraphs.

In connection with using the awareness techniques described herein, each user computer may include the same multi-user editor. A first user may open a document for editing with a multi-user editor application. The first user computer may send a message to one or more other user computers inviting each of these users to participate in a multi-user editing session as co-editors. Each of the user computers receiving the invitation message may send a reply message to the first user's computer indicating whether the invitation is accepted (e.g. will participate in the multi-user editing session), or not. If the reply message indicates acceptance, the replying system receives update messages regarding actions of other co-editors in the session. Additionally, in response to a user action, a user computer sends a message to other multi-user editor applications of the other co-editors indicative of the user action. Such messaging provides for synchronization and updating of each user computer of a co-editor in accordance with actions of all editing session participants. Information communicated may include, for example, what modifications are made to a document as well as the respective position of each co-editor within the document. In one embodiment, a peer-to-peer technique as just described may be utilized. One example embodiment of a multi-user editor is OneNote™ 2003 by Microsoft Corporation. The techniques described herein may be included in such an embodiment as well as other editors and applications.

It will be appreciated by those skilled in the art that other models, such as a client-server model, may also be used in order to facilitate the editing of a document by multiple users as a same time. Each user computer may include a local copy of the document which is kept synchronized with other local copies. Other embodiments may use other techniques. The multi-user editor 44 may collectively represent one or more components in accordance with a particular embodiment.

Figure 2A:
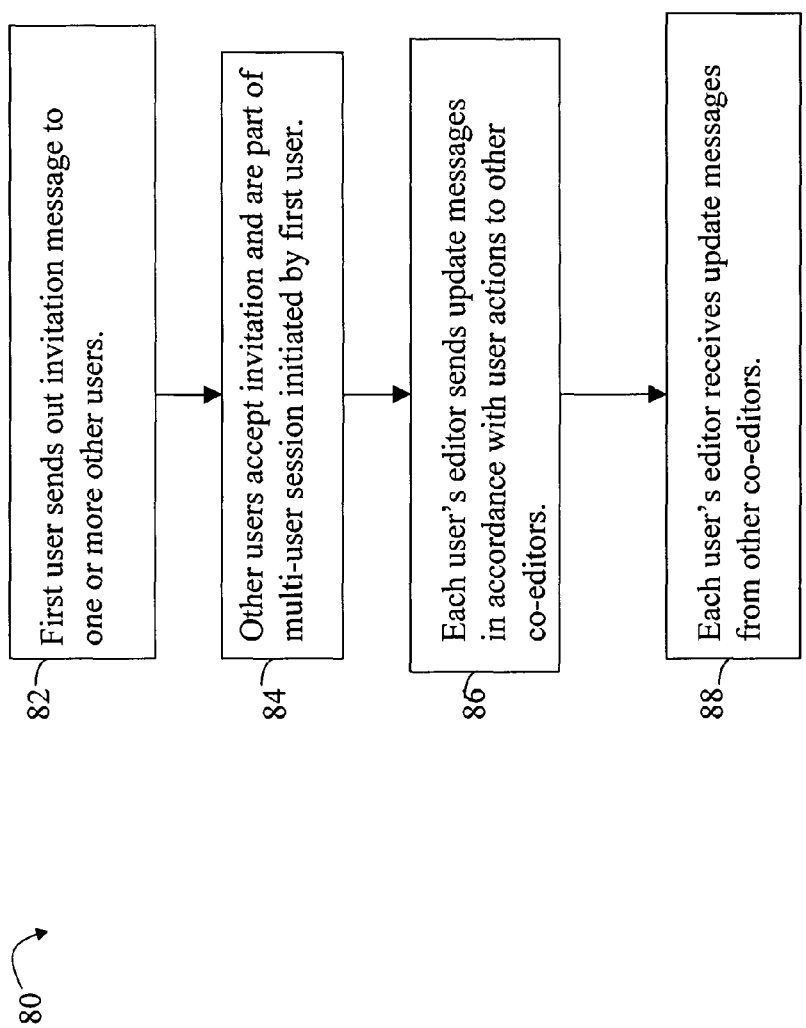
FIG. 2A is a flowchart of processing steps that may be performed in connection with the techniques described herein for multi-user editing of a document.

Referring now to FIG. 2A, shown is a flowchart of processing steps as may be performed in an embodiment in establishing a multi-user session using the multi-user editor. The steps of flowchart 80 summarize processing just described. At step 82, a first user sends out an invitation message to one or more other users on one or more user computers. It should be noted that the invitations to the various users may be sent at different times. At step 84, the other users each send a reply message. Those users accepting the invitation are part of the multi-user session initiated by the first user at step 82. Steps 86 and 88 may be continually performed during the editing session. At step 86, each user's editor sends update messages to other multi-user editors in accordance with each user's actions. At step 88, each user's editor, and possibly other processes that may be used in connection with the operations being performed, receives update messages from other multi-user editors in accordance with the actions of each co-editor.

During a multi-user editing session, situations may arise in which users may make conflicting text changes. For example, multiple users may edit the same document area, and their actions may conflict. If one user corrects a spelling mistake in a word, while another deletes the word, the end result is either a deleted word or a correctly spelled word leaving users perplexed as to why a particular edit operation failed. Use of the techniques described herein may be used to promote write awareness and utilize an approach that relies on social protocol for conflict avoidance. For example, social protocol may dictate that it is impolite to interfere with a co-editor's work and hence changes should be made away from a co-editor's workspace position. The techniques described herein using write shadows may be used to promote write awareness by showing the exact edit-positions of co-editors.

Figure 3:
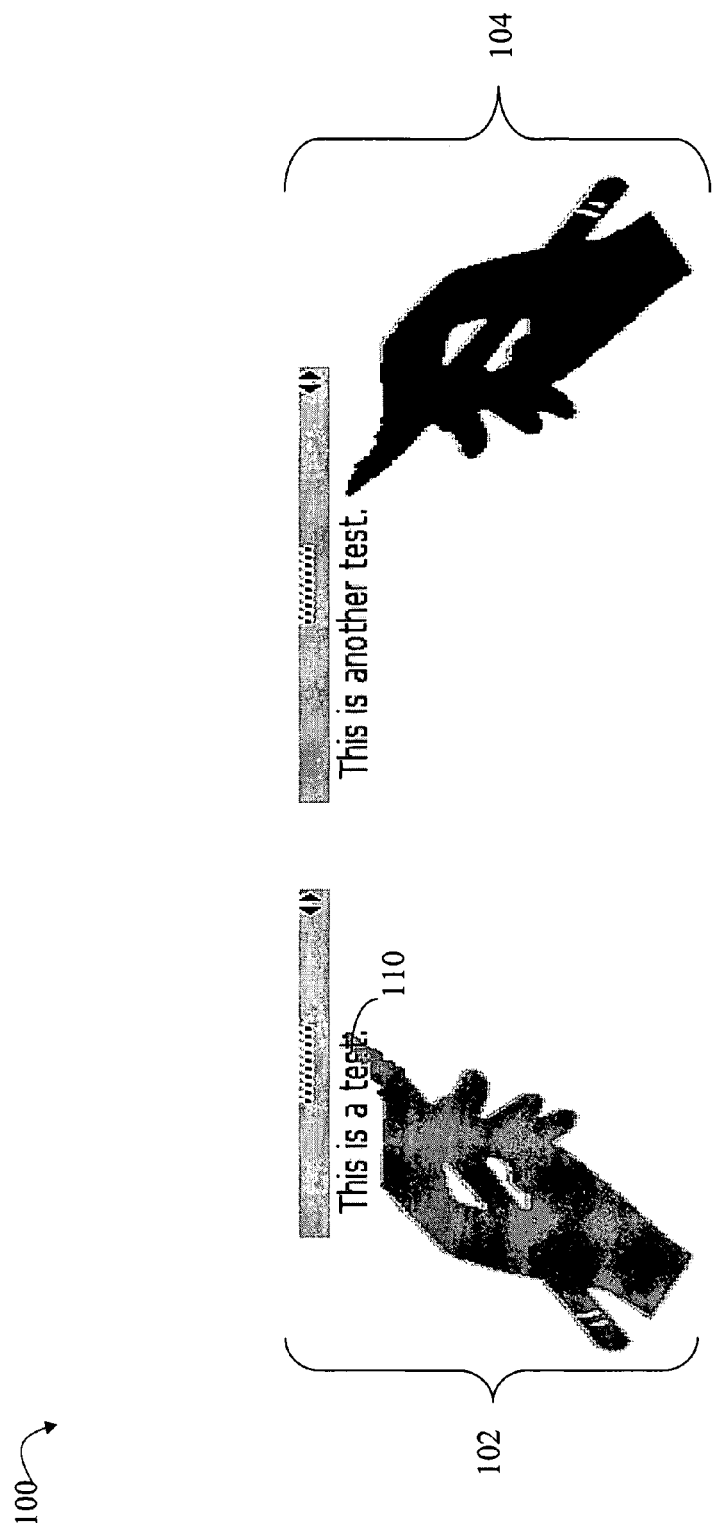
FIG. 3 is an example illustrating a representation of write shadows.

Referring now to FIG. 3, shown is an example illustrating use of write shadows. The example 100 illustrates one particular instance of a write shadow which is a hand holding a pencil although other shadows may be used. Other examples of shadows may include a hand with a finger pointing to a text location, a pointer pointing to a text location, and the like. The example 100 may be displayed on a first user's computer. A "right-hand holding a pencil" shadow 104 follows the local first user's edit position in the document, while a "left-hand holding a pencil" shadow 102 follows a co-editor's edit position. The tip of the pencil in each shadow is drawn exactly at the edit position the shadow is denoting. In the example 100, the medium gray shadow represents the position of a co-editor using 102 editing the left note. The dark gray shadow represents the position of a local first user as 104 editing the right note. The local first user can use the write shadows to avoid editing near or at the co-worker's editing position as indicated by 102. Note that, as described herein, the write shadows of 100 do not obscure the readability of underlying text portions. This is illustrated by 110 where the letters of "test" are readable and overlayed by the write shadow of 102. The foregoing use of overlaying of text is also illustrated in connection with other figures herein.

It should be noted that although the example 100 illustrates a local user with the right hand and a single remote user with a left hand, there may be more than one remote user represented using the write shadow. Each additional remote user may be represented in an embodiment using an additional left hand.

In addition to write awareness, read awareness may be obtained. As described herein, read awareness may be characterized as a user performing a modification knowing what other co-editors can view the user's editing (e.g., read awareness of the text being edited). Such read awareness may be useful in many collaborative editing scenarios. For example, during a collaborative editing session when a discussion of a particular document area is taking place, the discussion leader can determine when the discussion topic is stale by knowing when other users stop viewing the particular area of the document.

Read awareness can also reduce interruptions. Suppose a user makes a change to the document that a co-editor needs to know. Without use of read awareness the user may verbally inform the co-editor about the change. If the user knows that the co-editor has viewed the change, the verbal exchange may be avoided. The user is able to tell using read awareness techniques described herein which other co-editors are currently viewing the user's own actions.

Read awareness may also be helpful in the following situation. Suppose a user wants to edit a paragraph but knows that a co-editor is editing the same paragraph at the moment. The user may wait for the co-editor to finish in order to avoid conflict and duplication of work. If the co-editor is aware that the user is looking at the paragraph, the co-editor may make the changes quicker, move to a different document area, or some other action.

As another example, is a user is modifying a paragraph in the document and has a question about the paragraph, then knowing who else is looking at the paragraph may help target the question at the right co-editor. Read awareness may be characterized as a lead-in for ad-hoc collaboration.

One technique described herein using read shadows provide users with read awareness as will now be described.

Figure 4:
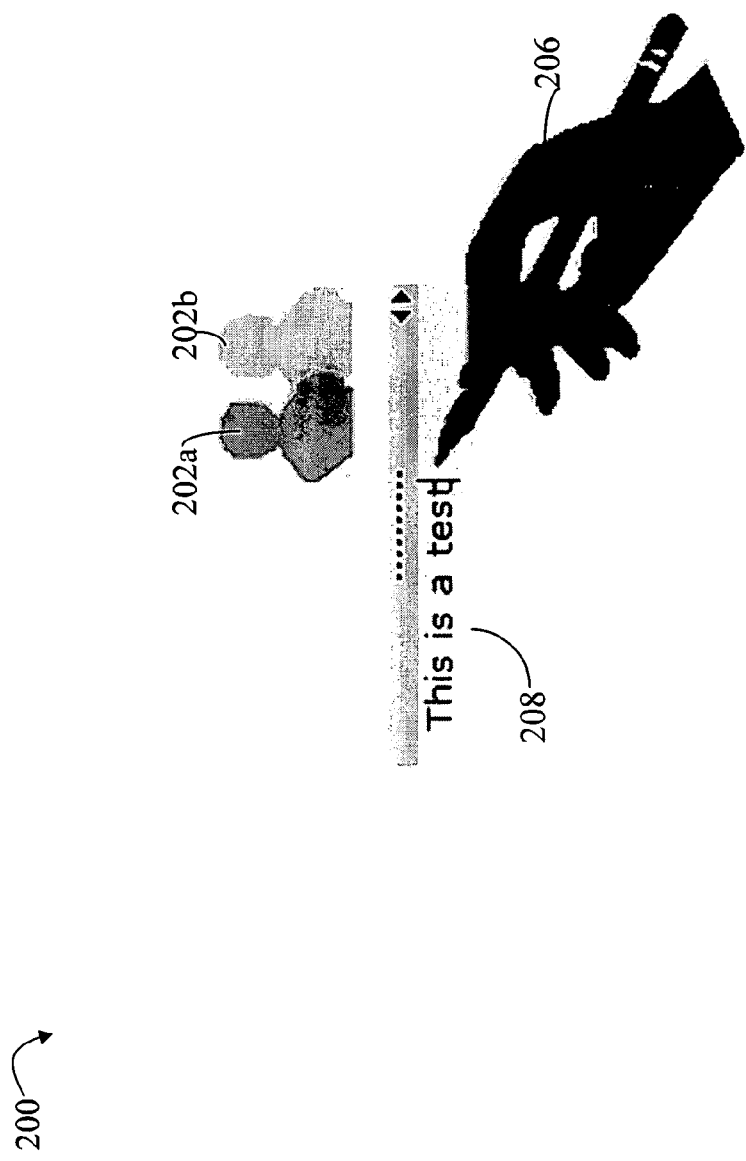
FIG. 4 is an example illustrating a representation of read shadows.

Referring now to FIG. 4, shown is an example illustration of a read shadow. The example 200 is a representation of a local user performing an edit with other co-editors viewing the edit. The text portion 208 is being editing by the local user having an edit position represented by 206. In one embodiment, if a co-editor can see the local user's edit position, a read shadow appears in the local user's view immediately above the local editing position represented by 206. In this example, there are two read shadows 202a and 202b each representing a co-editor who can view the current local user's editing action represented by 206. Element 206 in this example is a write shadow as described in connection with FIG. 3.

In this example, each of the read shadows 202a, 2020b is in the shape of an "over the shoulder" silhouette to portray the fact that someone else is looking over the shoulder of the local user's workspace position as denoted by the local user's write shadow 206. The read shadows are displayed immediately above the local user's edit position in order to attract the local user's attention while typing. As illustrated in FIG. 4, the read shadows provide awareness that the co-editors represented by the medium grey 202b and darker grey 202a read shadows can see the local user's (e.g. 206) edit position. The co-editors need not be writing or modifying near the local user. In other words, there may be read shadows 202a and 202b near the location being edited as represented by write shadow 206 without having other write shadows within the document.

The foregoing techniques provide read and write awareness. What will now be described are techniques for navigation awareness assisting users in synchronization of their views.

The ability to quickly and easily synchronize a local view of one user to the views of one or many other co-editors may be applicable for use in co-editing scenarios. For example, users participating as co-editors in a meeting viewing a document may perform multiple tasks during the meeting. A user may be focused on the meeting and viewing a portion of a document along with other co-editors. Subsequently, the user may perform another task and then attempt to later refocus attention on the meeting. The user may have to ask another co-editors what portion of the document is being discussed. A similar situation may arise when participants arrive to a meeting late. In such a situation, asking a co-editor that may be physically nearby what is being discussed at the moment may be considered impolite, unprofessional, or embarrassing. Using navigation awareness with the techniques described herein, a user, such as the late meeting arrival, may be directed to the document portions currently being discussed.

Navigation awareness may also be useful for users polling for changes. For example, if one user is editing figures while another is changing the figure data, the user responsible for the figures is able to quickly view what the other user is changing.

Figure 5:
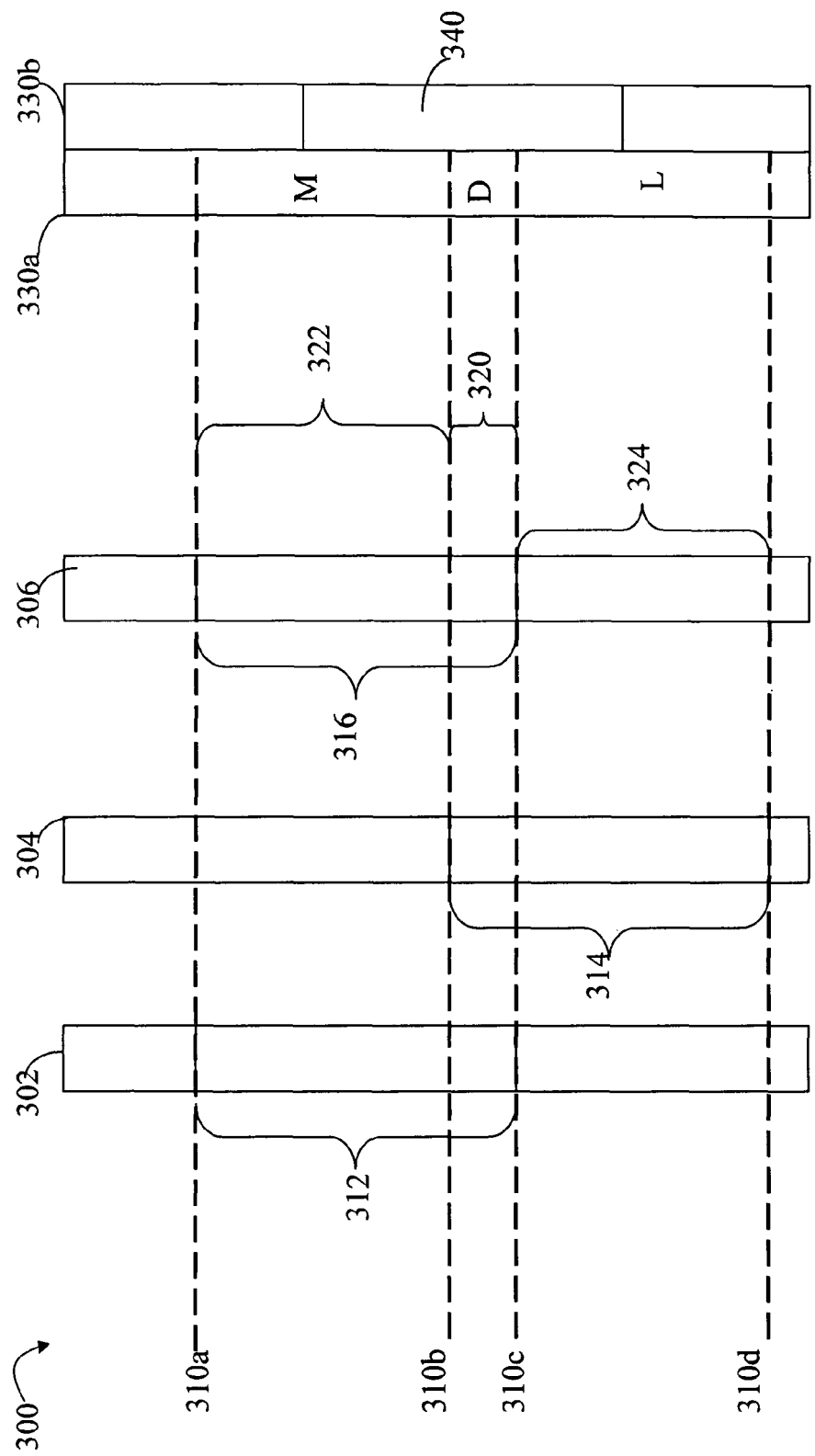
FIG. 5 is an example illustrating a representation of a shadowbar.

Referring now to FIG. 5, shown is an example of an embodiment of a shadowbar and how the shadowbar may be produced from one or more remote co-editors. The shadowbar is represented in the example 300 as element 330a. In this example, the shadowbar 330a is included in the display next to a local user's scrollbar elevator 330b representing a local user's current view position in the document. The remaining portion of the figure is described in following paragraphs and illustrates how the shadowbar 330a may be produced in accordance with the current scrolling positions of remote co-editors or users as represented by 302, 304 and 306.

The elements corresponding to 330a and 330b may be displayed, for example, on a right hand portion of a display of a text document being edited. The scrollbar elevator of the local user 330b may be included when editing a document in existing systems. The techniques described herein provide for the display of the shadowbar 330a.

The shadowbar may be characterized as a multiple user scrollbar reflecting a collective view of the scrollbar elevators of other co-editors. In the shadowbar, scrollbar elevators of co-editors are overlayed on one another and rendered semi-transparently. When multiple scrollbar elevators overlap, the overlapped region is painted with a color or shading that is a mix of all the overlapped scrollbar elevator colors or shadings. The overlapped area may also appear darker in shading or color and more opaque than any individual remote scrollbar elevator (e.g., 302, 304 and 306). This effect is similar to what happens when shadows from multiple light sources cross. The shadowbar elevators may be formed, for example, by mapping the size and position of a co-editor's scroll bar onto that of the shadowbar. It should be noted that the exact size and position of a co-editor's scrollbar elevator may vary from those of the shadowbar. This may occur, for example, due to variations in screen resolutions, window sizes, application settings, and the like, of the various systems.

In one embodiment representing scrollbars and shadowbars with shades of grey, an region of scrollbars may have a darker shading of grey than other nonoverlapping overlapping areas. In an embodiment representing scrollbars and shadowbars with color, the overlapping region may have a coloring and associated shading level in accordance with the degree of overlap. The resulting color may be, for example, a mix of all colors associated with overlapping scrollbars.

Referring to FIG. 5, what will now be described is an example of how the shadowbar may be determined in accordance with scrollbar elevators 302, 304 and 306. As described above, the example 300 illustrates a scenario having one local user with a scrollbar elevator 330b participating in a collaborative editing session with other co-editors having scrollbar elevators 302, 304 and 306. Portion 312 represents the scrollbar positioning for coeditor 302. Portion 314 represents the scrollbar positioning for co-editor 304. Portion 316 represents the scrollbar positioning for co-editor 306. The shadowbar 330a represents a collective view of the co-editors' 302, 304 and 306 scrollbars. The shading and/or coloring of the shadowbar 330a may be determined in accordance with the overlapping regions of the scrollbar elevators 302, 304 and 306. The overlapping regions may be determined by imposing regions 312, 314 and 316 onto a same scrollbar elevator. The level of shading may vary in accordance with the degree of overlap of the various regions 312, 314, and 316. The portion 320 bounded by lines 310b and 310c represents the region in which 312, 314 and 316 overlap. The portion 322 bounded by lines 310a and 310b represents the region in which 312 and 316 overlap, but not 314. The portion 324 bounded by lines 310c and 310d represents the region in which a portion of 314 occurs. In the 324, there is no overlap between 314, and 312 or 316.

Based on the degree of overlap, a visual indicator is provided to the local user regarding the view locations of the other remote co-editors. The area having the greatest degree of overlap in 300 is 320 and may have a corresponding darkest color denoted by area D in 330a. The area having the next greatest degree of overlap in 300 is 322 denoted by area M and may have a corresponding lighter coloring or shading than area D. The area having the least degree of shading is 324 and may have a corresponding lightest coloring denoted by area L in 330a. The resulting shading in the areas L, M, and D may be in accordance with the particular shading of the scrollbars for each user or co-editor and the degree of overlap. Each individual scroll bar 302, 304 and 306 may be represented using different colors or different levels of greyness as illustrated in differentiating the read shadows and/or write shadows of co-editors. The overlapping effect represented in 330a is the result of painting 330a with the shadings and colors of each individual scrollbars 302, 304 and 306. The final resulting display in 330a is affected by the colorings and shadings of each individual scrollbar and the way in which the scrollbars overlap one another when imposed as illustrated in FIG. 5.

Based on opaqueness and color darkness, the overlapping regions pinpoint where most users are looking. Thus, the foregoing use of the shadowbar can be used to navigate an area being viewed and discussed by a group of users. An embodiment of a screenshot may provide for comparison of the user's local position in the scrollbar 330b with the co-editors' as represented in 330a using the shadowbar. The shadowbar 330a provides for display of overlap when multiple co-editors are viewing a same document portion as well as when viewing different document portions.

In the foregoing, write shadows may be used in connection with write awareness to keep multiple users from writing to a same portion of a document. Read shadows may be used in making a particular writer aware of who else is viewing the modification or writing. The shadowbar may be used in connection with providing navigational awareness. The example illustrated in FIG. 5 is one embodiment in which a balance is maintained between required screen space and providing navigational awareness. A single additional scrollbar as a shadowbar is used to represent a synchronized composite view of all co-editors. The shadowbar illustrated herein is also transparent, like the read and write shadows, and does not require additional dedicated screen space. As will be further illustrated in connection with other figures herein, the shadowbar may also be superimposed on the actual text or document viewing area so that the underlying text is not obscured. The read shadows, write shadows, and shadowbar described herein do not use additional dedicated screen space beyond that normally used for rendering the text or other portions of a document. The shadowbar utilizes a small amount of additional space in order to provide the synchronized navigational awareness of other co-editors.

Figure 6:
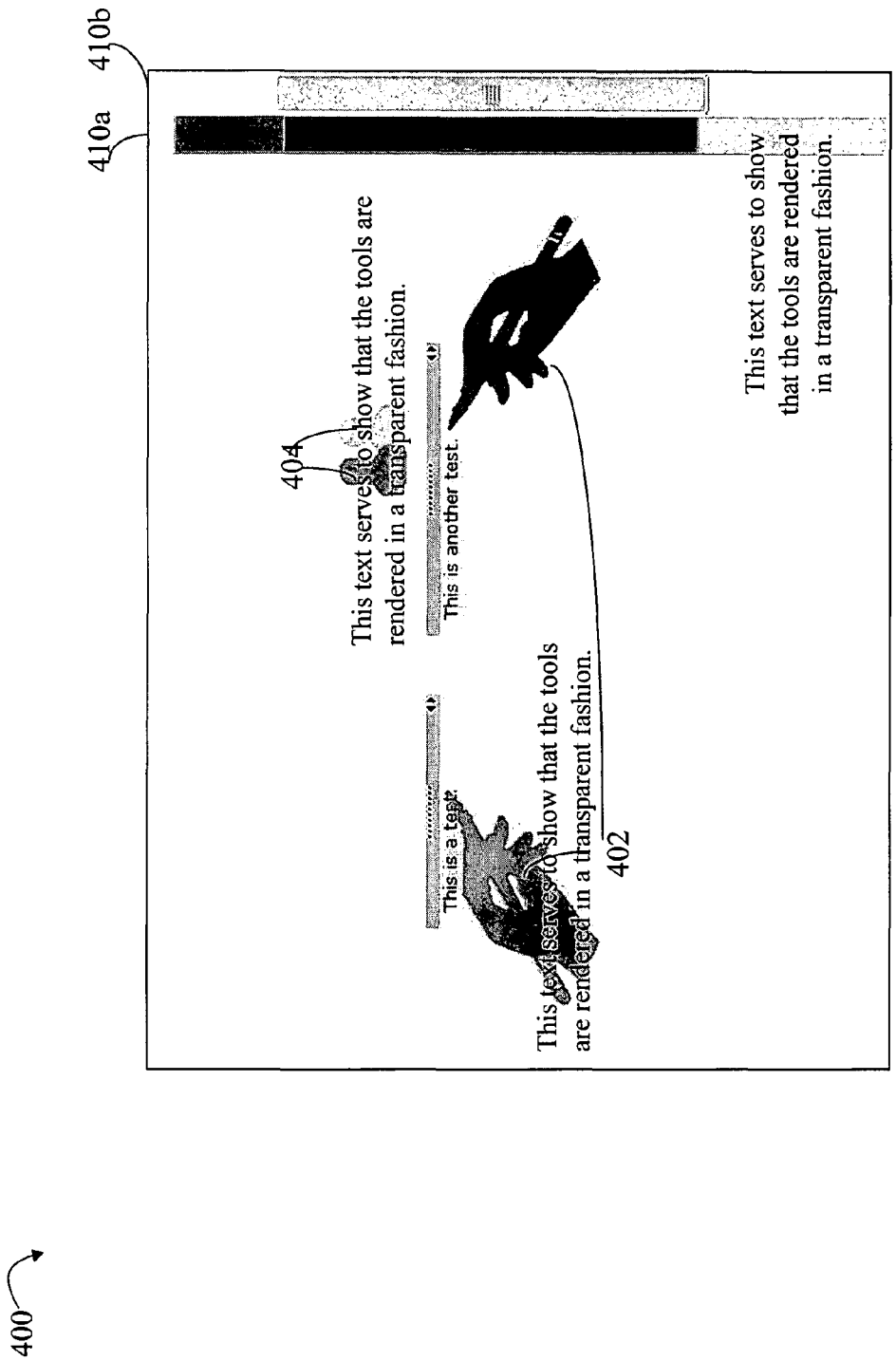
FIG. 6 is an example of a portion of a screenshot illustrating use of write shadows, read shadows and a shadowbar.

Referring now to FIG. 6, shown is an example 400 illustrating a screenshot utilizing all three of the awareness techniques described herein. The example 400 includes write shadows 402, read shadows 404, and a shadowbar 410a. The shadowbar 410a represents an example of different shades of grey in accordance with a degree of overlap of various co-editors editors. The display in 410a represents a synchronized collective view that can be compared to a local user's view as represented in 410b.

In connection with FIG. 6, note the in-place techniques in that the read shadows, write shadows, and shadowbars are superimposed in the text editing area and rendered transparently so that no text is obscured or hidden. As described elsewhere herein, each of 402 and 404 may be a different color indicating different users or co-editors. It should be noted that in an embodiment, each user may be associated with a unique shading or coloring with respect to other users. For example, a color blue may be associated with one user and a color red may be associated with a second user. Any read shadow, write shadow, and/or shadowbar corresponding to the first user may appear blue. Similarly, any read shadow, write shadow and/or shadowbar corresponding to the second user may appear as red.

The techniques described herein may be used in connection with a variety of different applications and scenarios. Described above are illustrative examples in connection with multi-user editing operations such as may occur, for example, when multiple users are reviewing and/or revising a document. As another example, the techniques described herein may be used in connection with a collaborative debugging environment. Two developers may be writing a portion of code and may use the techniques described herein for debugging the code as a collaborative effort. One developer may want to use the awareness techniques described herein to ensure that all developers are viewing a same code portion, memory location, and the like. A first user modifying a memory location may be denoted using a write shadow. Other users viewing this modification may be represented using the read shadows.

It should be noted that a study was performed by the inventors using the techniques described herein. The results of the study indicate, among other things, that write shadowing worked well to promote write conflict avoidance, the gaze or reader awareness provided by read shadows is useful for reducing unnecessary verbal communications, and the shadowbar appears most effective when coupled with read and write awareness, as using the read and write shadows described herein.

It should also be noted that an embodiment may utilize any one or more of the awareness techniques described herein. For example, an embodiment may utilize one or more of write shadows, read shadows, or shadowbars as described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:

establishing a collaborative session for a document being displayed at a local computing device of a local user editing the document with the local computing device, said collaborative session being between the local user and a plurality of remote other users accessing said document with remote computing devices, the session including a moveable cursor displayed within the document at the local computing device and indicating a moveable location within the document where input from the local user is inserted into the document, the location and cursor moving in the document in accordance with interactive input of the local user that changes the location within the document; and representing each of said plurality of users modifying a document using respective shadows, each shadow comprising an icon image representing a corresponding user, wherein the shadows are automatically positioned and displayed within the document at the local computing device based on the current location of the cursor within the document, wherein the shadows track the cursor such that they stay near the cursor while the user moves the cursor by inputting text to the document, and wherein whether a shadow is displayed or not at the local computing device is based on a determination of whether a remote user represented by the shadow is able to view the editing of the local user at the moveable location, wherein when one of the remote users is reading the document but not writing to the document the remote user is represented using a shadow indicating reading of the document.

2. The method of claim 1, wherein a first remote user has a first shadow and a second remote user has a second shadow, a proximity of said first shadow and said second shadow to the cursor indicating to the local user that said first and second users can see the location of said document that is being edited by the local user.

3. The method of claim 1, wherein the document comprises a text document and the editing comprises text editing.

4. The method of claim 3, wherein a shadow is rendered semi-transparently so that text underlying the shadow in a text-editing area is displayed by blending the shadow with such text.

5. The method of claim 1, wherein a local shadow represents the local user and moveably tracks the cursor.

6. The method of claim 1, wherein a shadowbar comprising a scrollbar at the local computing device is used to display scrollbar indicators for the plurality of remote users, respectively, each scrollbar indicator being displayed semi-transparently in the shadowbar with a changeable size and location in accordance with what portion of the document is navigated to at the corresponding remote computing device, wherein any given scrollbar indicator is able to overlap any other scrollbar indicator, and wherein the scrollbar indicators are displayed in the shadowbar by mutually blending any overlap of the semi-transparent scrollbar indicators such that a portion of the shadowbar increases in opacity and/or darkness as the number of scrollbar indicators overlapping the portion increases.

7. The method of claim 6, wherein a scrollbar corresponding to said local user is displayed at the local computing device next to said shadowbar, the scrollbar interactively manipulable to navigate the document.

8. A method comprising:

establishing a collaborative session for a document being displayed at a local computing device of a local user editing the document with the local computing device, said collaborative session being between the local user and a plurality of remote other users accessing said document with remote computing devices, wherein a moveable edit target moves within the document at the local computing device, wherein edits inputted by the local user are applied to the document at the edit target, and wherein the edit target moves within the document at the local computing device according to the edits inputted by the local user; and representing each remote user viewing said document with a respective read shadow, each read shadow comprising an image representing a corresponding remote user, an image having a shape that is independent what part of the document the corresponding remote user is viewing or editing, where the shadows are automatically positioned and displayed within the document at the local computing device based on the current position of the edit target within the document at the local computing device, wherein the shadows are automatically positioned to stay in proximity to the edit target as it is interactively moved by the user, wherein when the user is inputting text at the edit target the edit target and shadows move together, and where a determination is made whether to display a read shadow at the local computing device based on a determination of whether the editing of the local user is displayed at a remote computing device corresponding to the read shadow, wherein shadows representing remote users not editing the document are displayed with a different appearance than shadows representing remote users that are editing the document.

9. The method of claim 8, wherein said collaborative session includes the users writing to the document without obtaining a lock of the document.

10. The method of claim 8, wherein a read shadow is rendered semi-transparently so that text underlying the read shadow in the is displayed as a blend of the text and the read shadow.

11. The method of claim 8, wherein a shadowbar is used to display scrollbar elevators of the remote computing devices in a single column, an area of of said shadowbar being rendered based on a degree of overlap of the scrollbars elevators.

12. Computer-readable storage medium storing information to enable a computer to perform a process, the process comprising:

establishing a collaborative session for a document being displayed at a local computing device of a local user editing the document with the local computing device, said collaborative session being between the local user and a plurality of remote other users accessing said document with remote computing devices, wherein a moveable cursor moves within the document at the local computing device, wherein edits inputted by the local user are applied to the document at the cursor, and wherein the cursor moves within the document at the local computing device according to the edits inputted by the local user; and representing each remote user viewing said document with a respective shadow, each shadow comprising an image representing a corresponding to a remote user, an image having a shape that is independent what part of the document the corresponding remote user is viewing or editing, where the shadows are automatically positioned and displayed within the document at the local computing device based on the current position of the cursor within the document at the local computing device, wherein whether to display a shadow at the local computing device is based on a determination of whether the editing of the local user is displayed at a remote computing device corresponding to the shadow, wherein the document is locally displayed in a local window of the local computing device and concurrently displayed in a remote window of one the remote computing devices, the remote and local windows both partly displaying a same common portion of the document such that each also has a respective portion of the document not displayed by the other, and displaying a shadow for the user of the remote window when the cursor is in the common portion and not displaying a shadow for the user of the remote window when the cursor is in the portion of the document displayed at the local window but not at the remote window.

13. A computer-readable storage medium according to claim 12, wherein the shadows comprise image icons and the image icons are displayed and kept in proximity to the cursor as the cursor moves in the local window such that the image icons track the cursor.

14. A computer-readable storage medium according to claim 12, wherein the appearance of a shadow displayed in the local window changes based on whether the user represented by the shadow is editing the document.

15. A computer-readable storage medium according to claim 12, wherein whether the shadow for the user of the remote window is displayed on the local computing device depends on whether the cursor is in a portion of the document that is visible at the remote window.

* * * * *